UNITED STATES PATENT OFFICE.

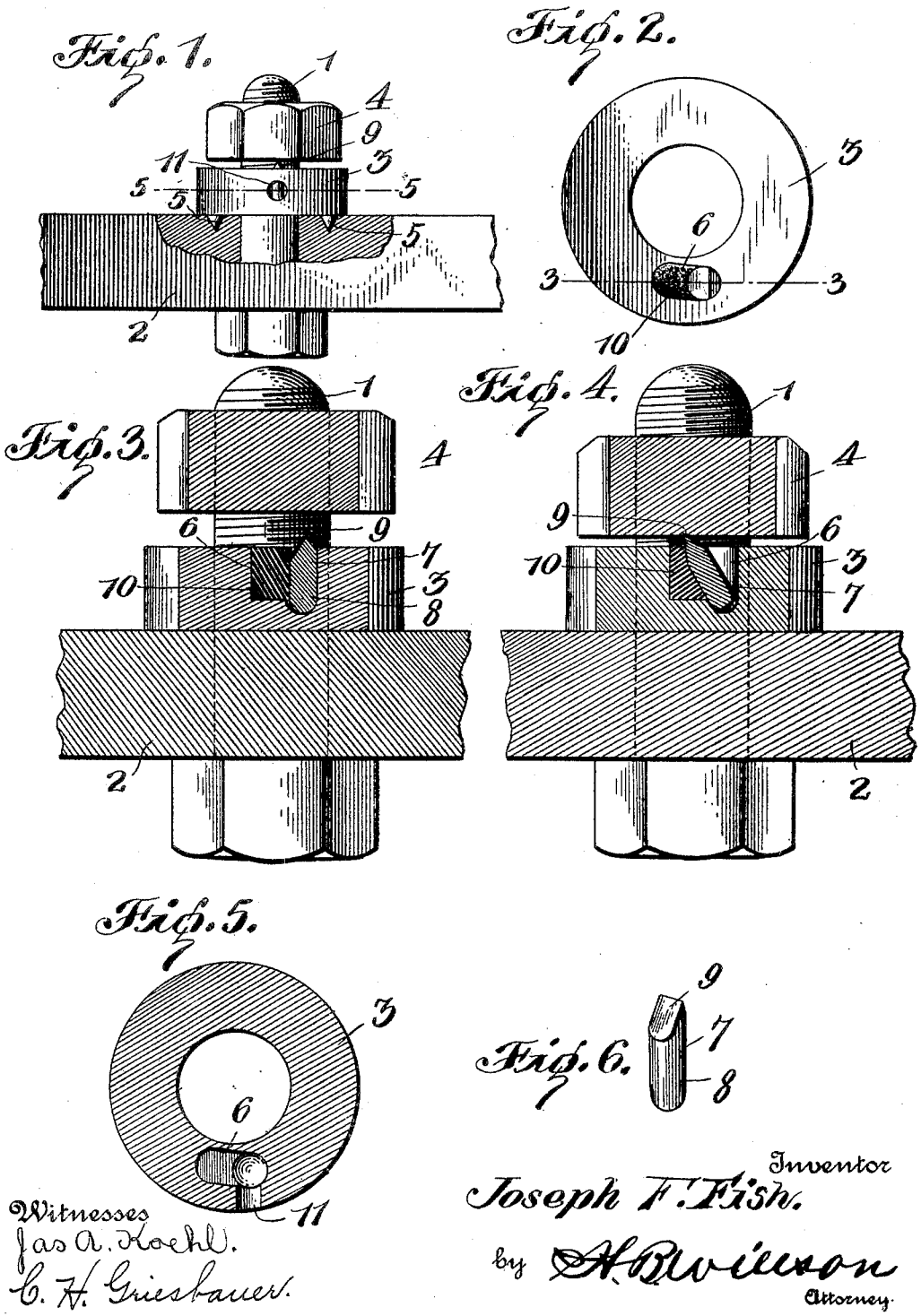

JOSEPH F. FISH, OF CHICAGO, ILLINOIS.

NUT-LOCK.

No. 797,673.  Specification of Letters Patent.  Patented Aug. 22, 1905.

Application filed December 12, 1904. Serial No. 236,560.

*To all whom it may concern:*

Be it known that I, JOSEPH F. FISH, a citizen of the United States, residing at Chicago, in the county of Cook and State of Illinois, have invented certain new and useful Improvements in Nut-Locks; and I do declare the following to be a full, clear, and exact description of the invention, such as will enable others skilled in the art to which it appertains to make and use the same.

My invention relates to improvements in nut-locks of that class in which the nut is locked by a clutch which engages its base.

The object of my invention is to provide a device of this character which will be simple in construction, durable in use, very effective for the purpose intended, and comparatively inexpensive to manufacture.

With the above and other objects in view the invention consists of certain novel features of construction, combination, and arrangement of parts, as will be more fully described, and particularly pointed out in the appended claim.

In the accompanying drawings, Figure 1 is a side elevation of a nut-lock constructed in accordance with my invention. Fig. 2 is a plan view of the locking-washer, the nut being removed. Fig. 3 is a sectional view taken on the line 3 3 in Fig. 2. Fig. 4 is a similar view showing the nut locked to the washer. Fig. 5 is a detail sectional view taken on the line 5 5 of Fig. 1, and Fig. 6 is a detail view of the locking-pawl.

Referring to the drawings by numerals, 1 denotes a screw-bolt passed through an object or element 2 and having upon its threaded end a locking-washer 3 and a nut 4. The bolt and nut are of the ordinary form, and the washer 3 is somewhat thicker than the usual washer. Said washer has upon its under or inner face one or more biting teeth or spurs 5, which are adapted to engage or embed themselves in the object or element 2 to prevent the rotation of the washer 3 upon the bolt 1. In the opposite face of the washer, adjacent to its centrally-disposed bolt-hole, is a recess 6 of oval form. This recess, which extends longitudinally, is preferably formed by drilling two adjacent holes or cavities and cutting away the intermediate metal, so as to form a recess or cavity of elongated circular form in cross-section. One of the holes which is thus drilled to form the cavity 6 is somewhat deeper than the other, so as to adapt it to receive a pawl 7, which has a cylindrical body portion 8 and a tapered or beveled biting end 9, adapted to engage the base or under side of the nut 4. The lower end of said pawl is semispherical, so that the latter may tilt or swing in the recess 6. The pawl is retained in said recess and is held normally in an upright position, so that its beveled or chisel-like end 9 projects beyond the outer face of the washer and engages the nut 4 by means of a small block 10, of elastic rubber. It will be seen that when the nut is screwed down upon the bolt and the washer the rubber block 10 will yield sufficiently to permit the beveled end 9 of the pawl to drop beneath the outer surface of the washer; but as soon as the nut is turned in the opposite direction the said rubber block will force the end 9 of the pawl out of the recess 6 until it engages the base of the nut and bites into the same to prevent said nut from being unscrewed. In order to disengage the pawl from engagement with the nut, so that the latter may be removed, I provide in the washer a transversely-extending recess 11, which communicates with that end of the recess 6 in which the pawl 7 is located. It will be seen upon reference to Fig. 5 of the drawings that when a pointed instrument is inserted in the opening or recess 11 and forced behind the cylindrical body portion 8 of the pawl the latter may be forced downwardly into the recess 6 sufficiently to disengage its bevel end 9 from the base of the nut.

The construction, operation, and advantages of my invention will be readily understood from the foregoing description, taken in connection with the accompanying drawings. This lock may be used upon railways or upon any kind of work, and it will effectively prevent the nut from loosening upon the bolt. The device is of simple and durable construction and may be manufactured at a comparatively small cost.

Various changes in the form, proportion, and the minor details of construction may be resorted to without departing from the principle or sacrificing any of the advantages of this invention.

Having thus described my invention, what I claim as new, and desire to secure by Letters Patent of the United States, is—

A nut-lock comprising a device having an elongated recess in one side, said recess being provided with perpendicular walls and having one end deepened at the bottom to provide a semispherical seat at the base of one of said perpendicular walls, a pawl having a semispherical end in said seat, said pawl being of a length exceeding the depth of the deepened end of the recess and having its free end pointed, and a spring-cushion in the shallower portion of the recess, bearing against the pawl and normally pressing the latter against the proximate perpendicular wall of the recess, to hold the pawl normally in a perpendicular position, substantially as described.

In testimony whereof I have hereunto set my hand in presence of two subscribing witnesses.

JOSEPH F. FISH.

Witnesses:
    OLE STENSLAND,
    L. F. BOEDECKER.